APPARATUS FOR INDICIA RECOGNITION

Filed Jan. 3, 1949 5 Sheets-Sheet 1

INVENTORS
LESLIE E. FLORY
& WINTHROP S. PIKE
BY Morris B. Rabkin
ATTORNEY

INVENTORS
LESLIE E. FLORY AND
WINTHROP S. PIKE
BY Morris Kahn [signature]
ATTORNEY Oct. 28, 1952 L. E. FLORY ET AL 2,615,992

APPARATUS FOR INDICIA RECOGNITION

Filed Jan. 3, 1949 5 Sheets-Sheet 3

INVENTORS
LESLIE E. FLORY &
WINTHROP S. PIKE
BY Morris L. Rabkin
ATTORNEY

APPARATUS FOR INDICIA RECOGNITION

Filed Jan. 3, 1949 5 Sheets-Sheet 4

INVENTORS
LESLIE E. FLORY &
WINTHROP S. PIKE
BY Morris L. Kahn
ATTORNEY

INVENTORS
LESLIE E. FLORY &
WINTHROP S. PIKE
BY Morris L. Rabkin
ATTORNEY

Patented Oct. 28, 1952

2,615,992

UNITED STATES PATENT OFFICE 2,615,992

APPARATUS FOR INDICIA RECOGNITION

Leslie E. Flory and Winthrop S. Pike, Princeton, N. J., assignors to Radio Corporation of America, a corporation of Delaware Application January 3, 1949, Serial No. 68,888

14 Claims. (Cl. 179—100.3)

Figure 1:
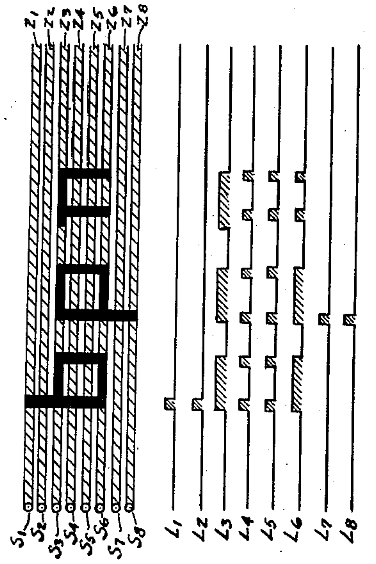
Figure 17:
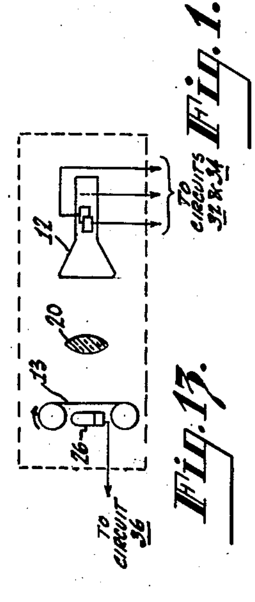

This invention relates to improvements in the art of indicia recognition, and more particularly to an improved method of and apparatus for generating electrical voltages or voltage groups having a predetermined relation to indicia of any characteristic shape or contour outlined on a contrasting surface.

While not limited thereto, the invention finds special application in reading aids for the blind, and will be particularly described in connection with apparatus for translating indicia into acoustical energy in the form of sounds characteristic of a spoken language. For the purpose of simple disclosure, the description will be limited to apparatus for recognizing and translating indicia in the form of printed letters, although it should be understood that the principles of the invention are equally applicable to the recognition and translation of indicia which are outlined by perforations, stampings, or any tracing in or on a surface whereby said indicia appear in contrast to said surface.

Considered from one aspect, the present invention is an improvement on the method and system disclosed in the copending application of V. K. Zworykin et al., Serial No. 68,887, filed January 3, 1949, assigned to the same assignee as the present invention. As is explained in the aforesaid Zworykin et al. application, it has previously been proposed to translate printed matter into arbitrary tonal sounds in the nature of a code, whereby one trained in the use of the code can obtain an understanding of the content of printed material. (See, e. g., U. S. P. 2,420,716; 1,350,954; 2,451,014.) It has further been proposed to translate printed indicia (also in the nature of a code) into articulate sounds characteristic of a spoken language. (See, e. g., Flory application Serial No. 713,175, filed November 29, 1946, now Patent No. 2,517,102 issued August 1, 1950.) Since such code systems require either special operator training or the preparation of a programming tape with specially coded indicia, they are of limited applicability.

In the aforementioned copending Zworykin et al. application, a method is disclosed for indicia recognition and translating, and especially for translating printed matter into articulate sounds characteristic of a spoken language, wherein arbitrarily selected zones of the printed matter are each individually scanned with light energy. As the printed matter is scanned, individual characters are identified by evaluating the number (or the number and duration) of changes in the amount of light reflected from each of the zones due to contrasting light-reflective properties of the printed matter (i. e. changes from "black" to "white" and vice versa). Unique groups of voltages are generated which correspond to the evaluated information, and these voltages are utilized to control the generation of articulate sounds characteristic of a spoken language.

The present invention relates to indicia recognition of the above general type, and has for its principal object the provision of an improved method of and apparatus for recognizing and translating from a surface indicia of contrasting energy reflective properties by scanning the surface with pulsating beams of energy.

A further object of the invention is to provide means for simplifying indicia recognition by determining the sequence in which the light-reflecting properties of an indicia-bearing surface vary in two or more segmental zones of the surface.

Figure 2:
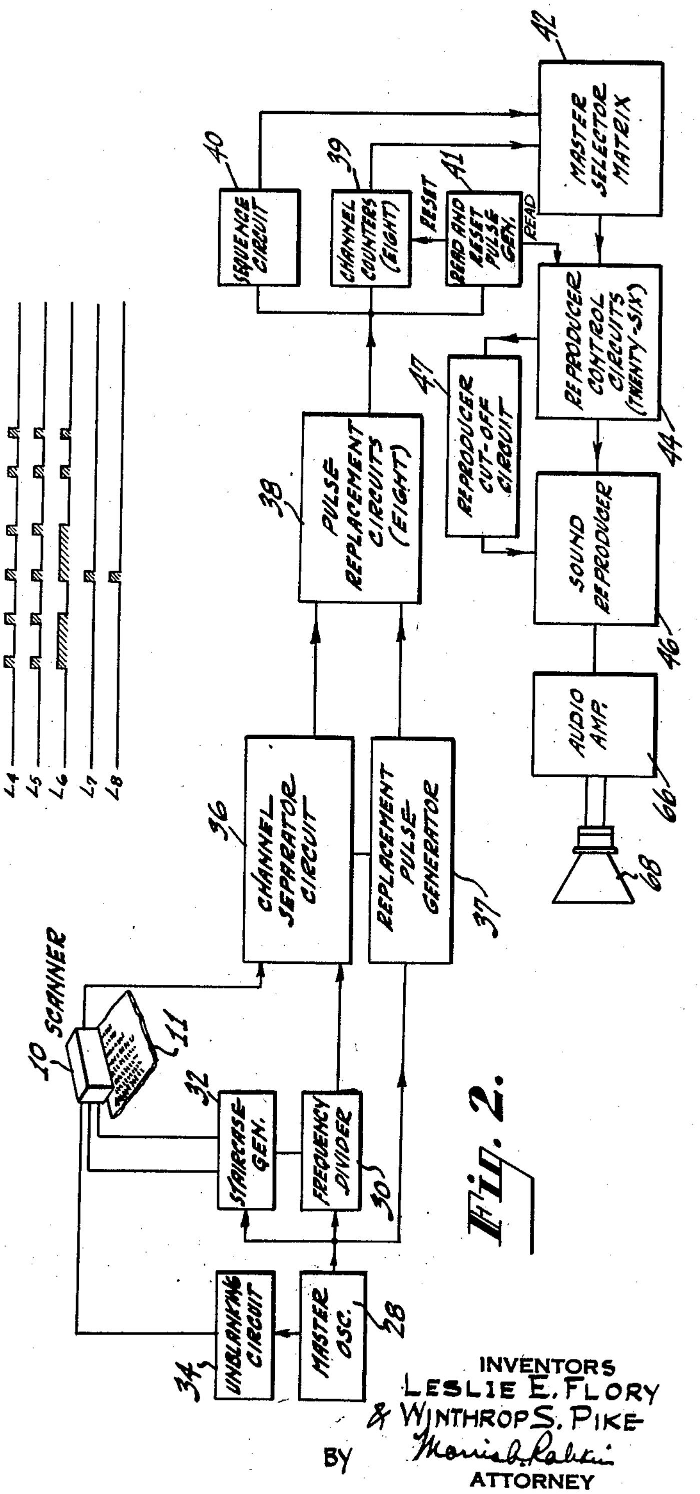
Figure 3:
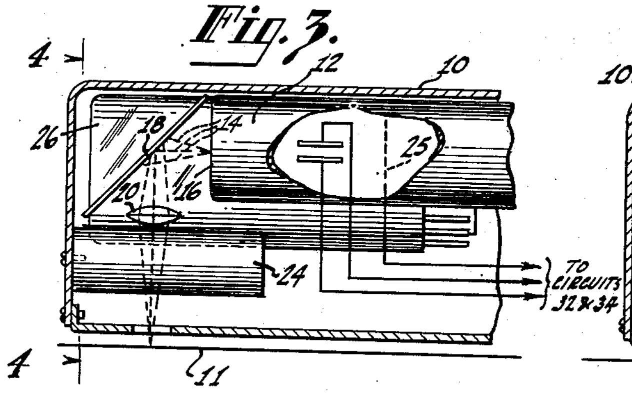
Figure 4:
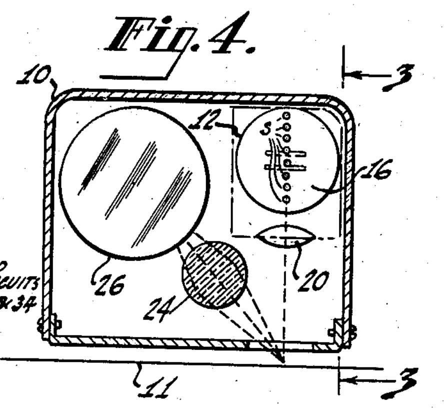
Figure 5:
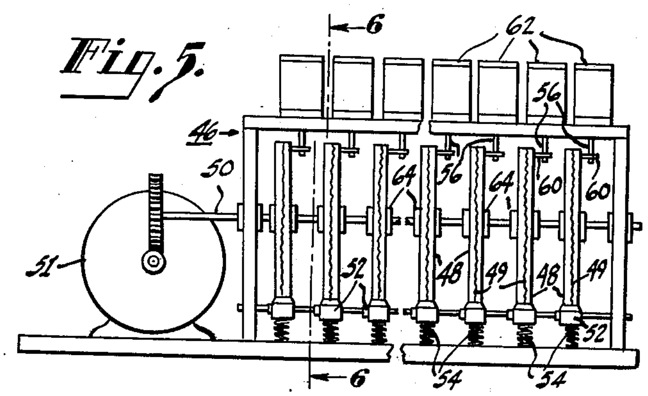
Figure 6:
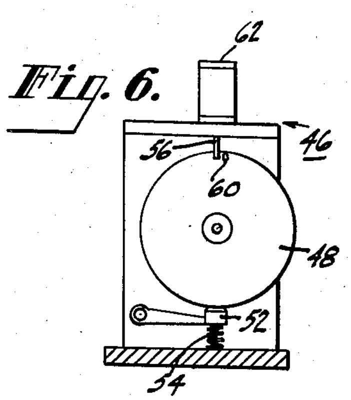
Figures 10, 11:
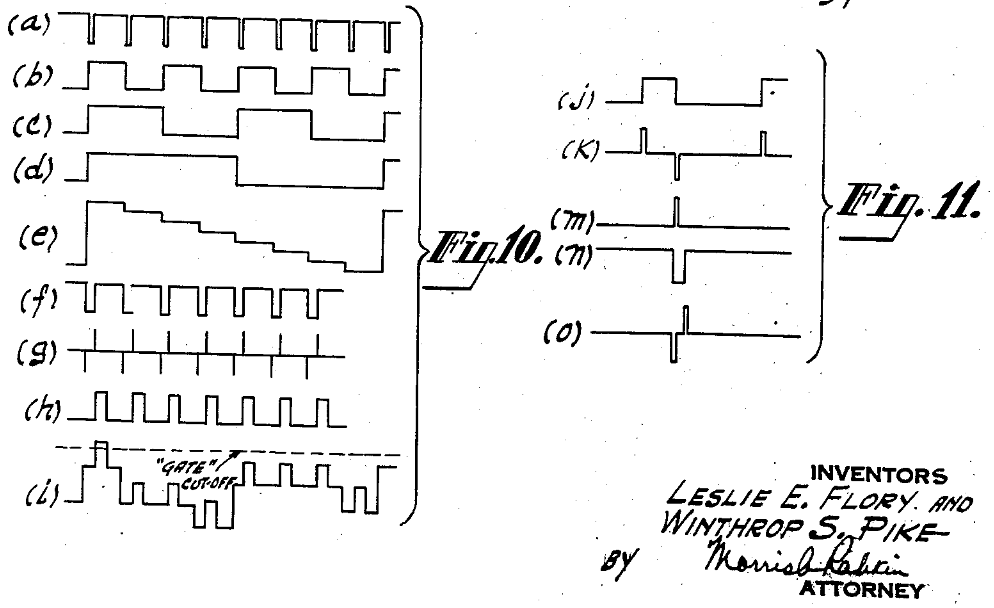
Figure 7:
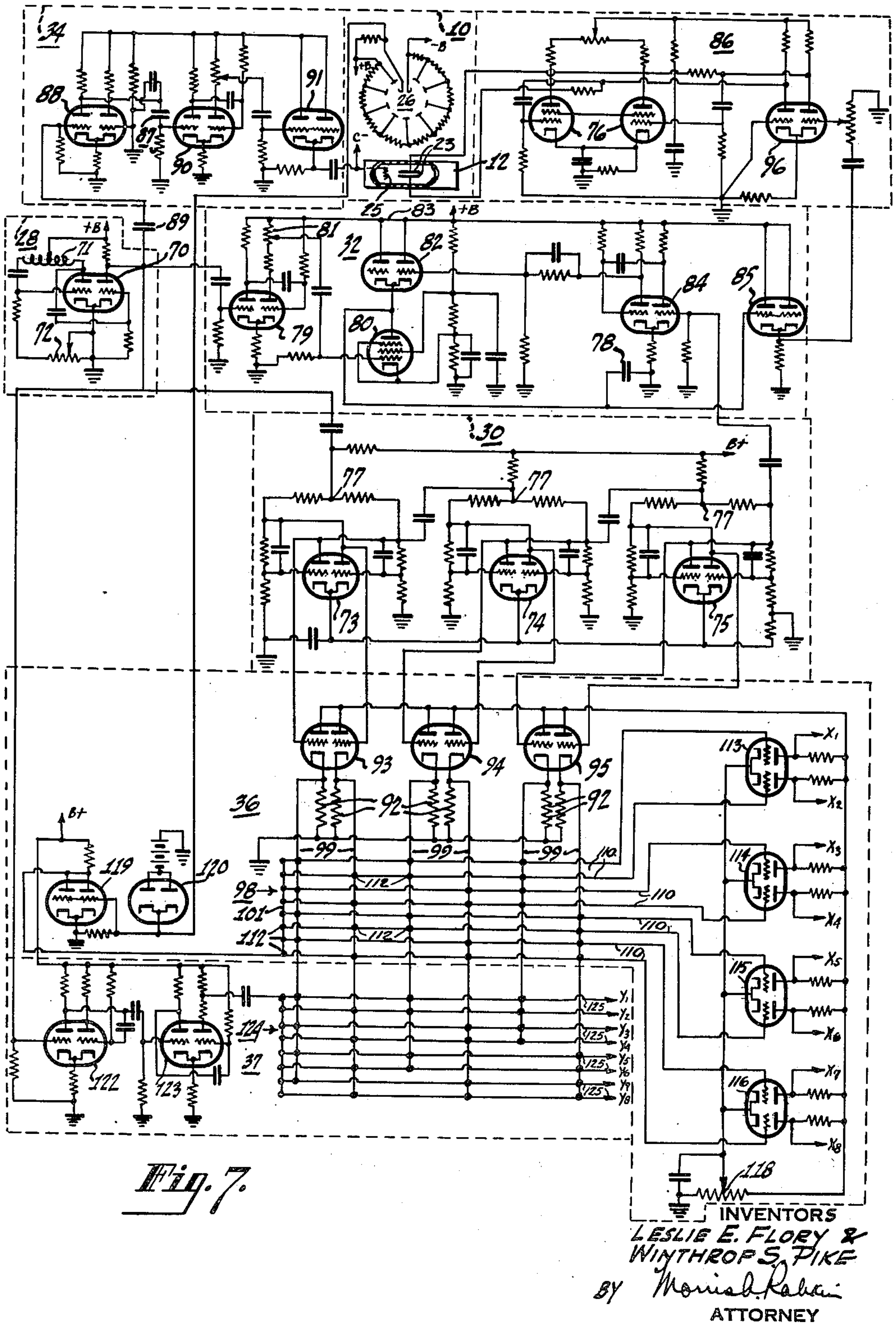
Figure 8:
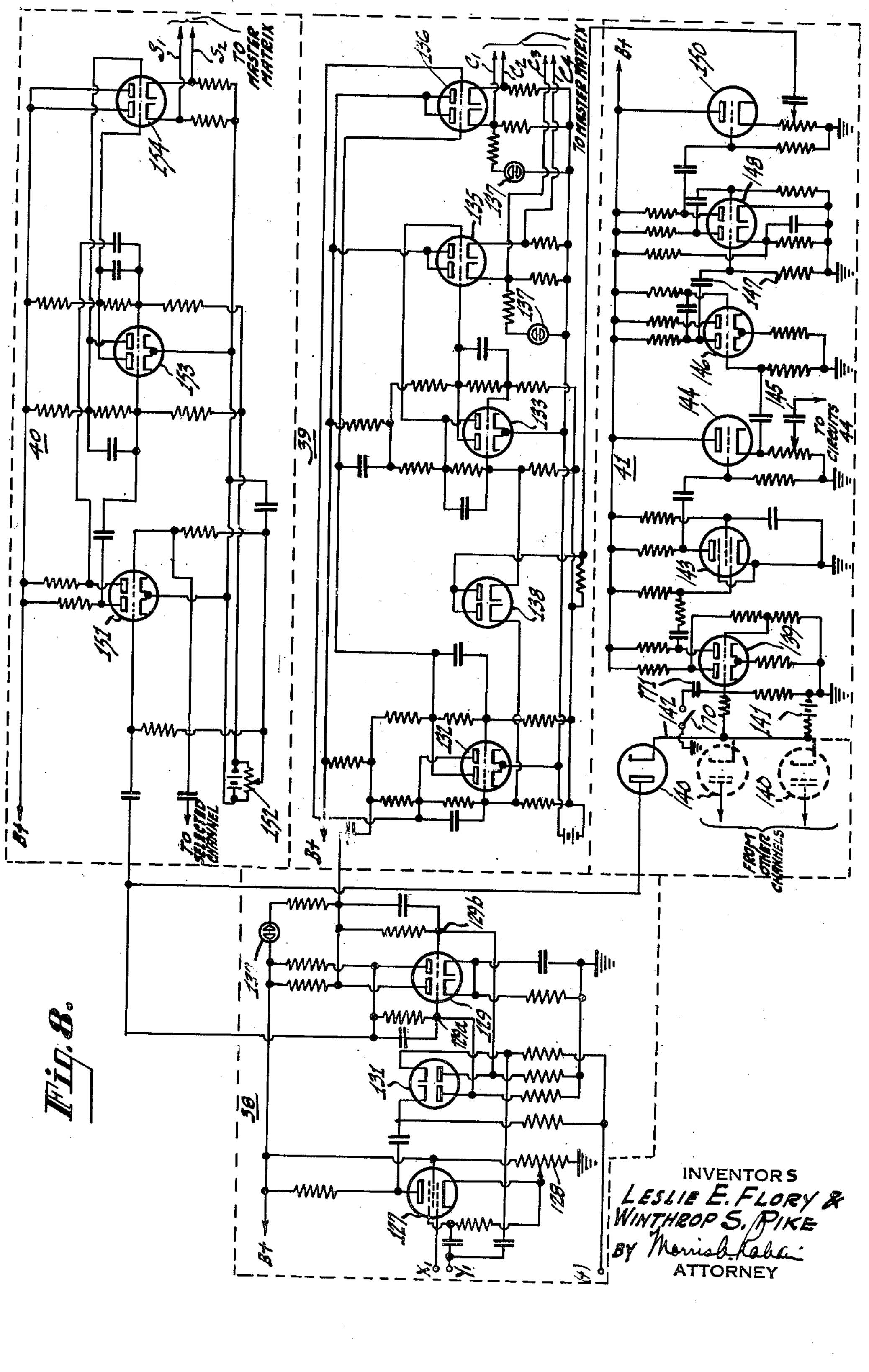
Figures 9, 12:
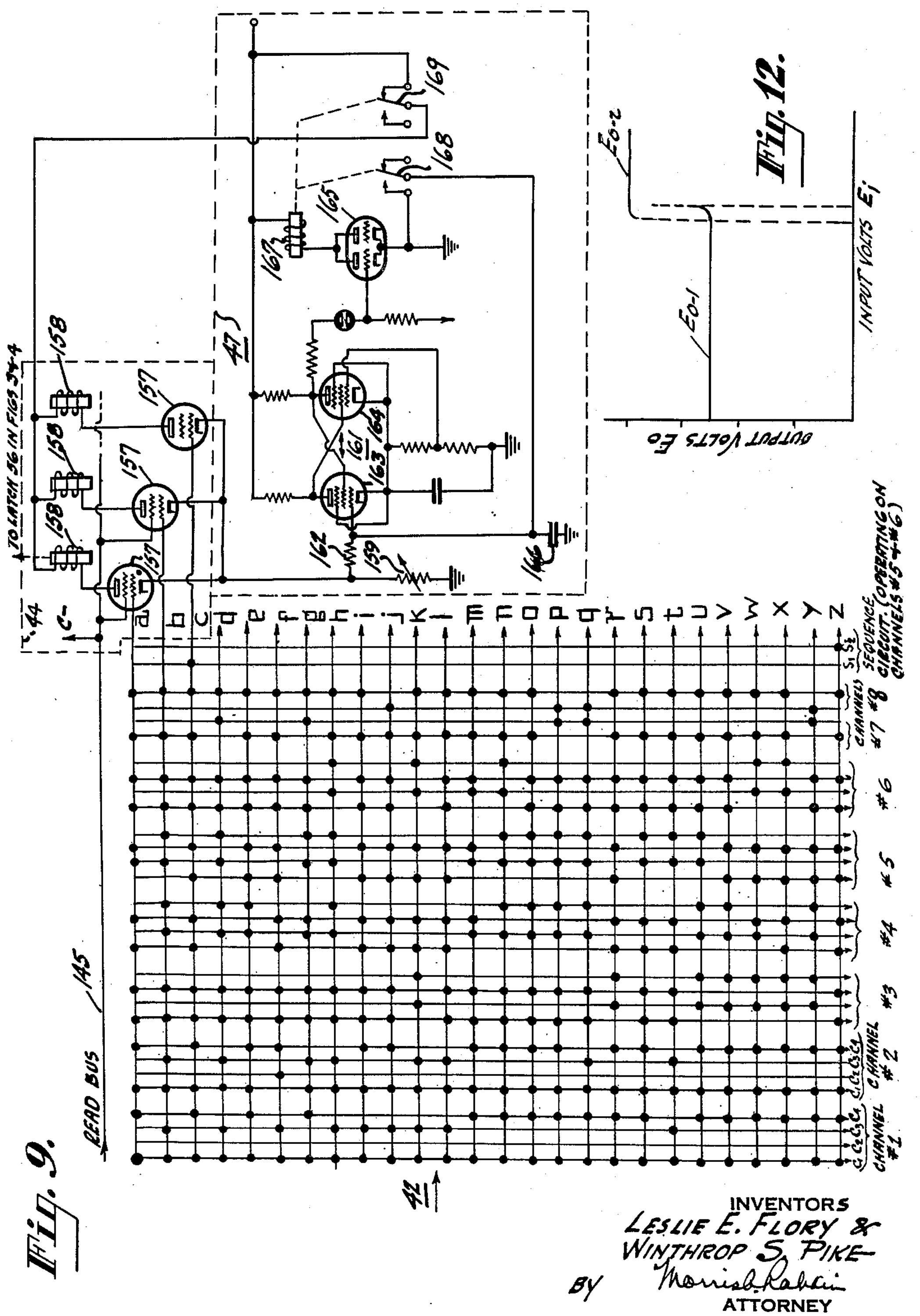

The foregoing and other objects and advantages of the invention will be brought out more fully in the following description of an illustrative embodiment thereof, when considered in connection with the accompanying drawings, in which:

Figure 1 illustrates diagrammatically one of the principles on which the present invention is based, Figure 2 illustrates, partly in perspective and partly in block diagram form, a complete reading aid apparatus arranged in accordance with the invention, Figure 3 is a plan view of a scanning device comprising one component of the apparatus of Figure 2, Figure 4 is an end view of the scanning device, taken on the line 4—4 of Figure 3, Figure 5 is a plan view of a sound reproducer which comprises one of the components of the apparatus of Figure 2, Figure 6 is an end view, taken on the line 6—6, of the sound reproducer of Figure 5, Figures 7, 8 and 9 are schematic diagrams of circuits corresponding to the lettered blocks of Figure 2, Figures 10 and 11 show some of the voltage wave forms in the apparatus of Figure 2, Figure 12 shows an operating characteristic of one portion of the circuit of Figure 8, and Figure 13 is a view of a modified scanning arrangement suitable for use with the apparatus of Figure 2.

One of the principles underlying indicia recognition of the type with which the present invention is concerned can best be explained by reference to Figure 1, wherein there are shown three arbitrarily selected letters "b," "p," and "n," such as might appear in a line of printed matter. The printed matter comprising the three letters "b," "p," "n" appearing on a contrasting surface is to be traversed or scanned by eight "spots" of light S1–S8, each of which illuminates a horizontal segmental zone of the printed matter. As the spots S1–S8 are moved from left to right, they establish eight hypothetical zones of illumination Z1–Z8. It will be understood that the number of zones illustrated is not critical, provided sufficient definition is attainable between the letters or other indicia involved. As the spots of light S1–S8 are moved from left to right, the amount of light reflected from each of the zones Z1–Z8 will vary as each of the light spots S1–S8 encounters the black and white areas defined by portions of each of the letters "b," "p," "n." Eight lines L1–L8 have been placed directly beneath the letters in Figure 1 to represent the contrasting reflecting properties of the printed matter within each of the eight zones Z1–Z8. It will be understood that the unshaded portions of each of the eight lines L1–L8 correspond to conditions of normal or "white" reflection within each of the eight zones, while the shaded portions of the lines L1–L8 correspond to subnormal or "black" reflections within each of the eight zones. For each of the letters in Figure 1, the number of changes from "white" to "black" reflection (or vice versa) can be counted for each zone, and the number of zonal changes per letter can be grouped to characterize each letter. This is illustrated in the following Table I, in which the number of changes per zone per letter is tabulated.

*Table I*

| Zone | "b" | "p" | "n" |
|---|---|---|---|
| Z1 | 1 | 0 | 0 |
| Z2 | 1 | 0 | 0 |
| Z3 | 1 | 1 | 1 |
| Z4 | 2 | 2 | 2 |
| Z5 | 2 | 2 | 2 |
| Z6 | 1 | 1 | 2 |
| Z7 | 0 | 1 | 0 |
| Z8 | 0 | 1 | 0 |

It will be observed that there is a unique group of zonal reflection changes for each of the three letters shown in Figure 1 which serves to characterize the corresponding letter. As will be shown hereinafter, the information obtained by counting the number of changes in the light reflecting properties in each zone can be used to selectively control the reproduction of the actual letter sounds.

It will also be noted in Figure 1 that changes in the reflecting properties of the printed matter occur in a characteristic sequence. Thus, for example, the letter "b" shows a change in the first and second zones occurring simultaneously with changes in the third, fourth, fifth, and sixth zones. On the other hand, the letter "d" (not shown) would exhibit changes in the first and second zones occurring subsequently to changes in the third, fourth, fifth, and sixth zones. Such characteristic "reflection change sequences" can be relied on to further distinguish between the letters of printed matter, and it is one of the objects of the present invention to provide for character identification both in terms of the number of zonal changes per letter and in terms of the sequence in which changes occur in two or more zones of the printed matter.

Referring, next, to Figure 2 of the drawings, there is shown, partly in perspective and partly in block diagram form, apparatus for translating printed matter into articulate sounds characteristic of a spoken language, in accordance with the invention. In Figure 2, the elements of the apparatus are seen to include a scanning device 10 for projecting pulsating light energy onto the printed matter 11 to be translated, and for picking up the light reflected from each of a plurality of hypothetical zones of the printed matter 11.

The scanning device 10 is illustrated in detail in Figures 3 and 4, and is seen to include a cathode ray tube light source 12, positioned to direct pulsating light beams 14, generated at the screen 16 of the tube 12, onto a mirror 18 located above a lens 20 which serves to focus the light beams 14 from the cathode ray tube on a sheet of printed matter 11. The cathode ray tube has one set of deflecting plates 23 and a control grid 25, as well as the usual cathode and anodes which have been omitted from the drawing for simplicity. Light reflected from the sheet of printed material 11 is focused by a second lens 24 onto a light sensitive element, such as a photo multiplier tube 26, which serves to detect the reflected light energy and to generate pulses of electrical energy representative of the reflecting properties of the printed matter 11, in a manner to be described hereinafter.

Figure 13 shows the elements of a modified scanning arrangement suitable for use in the apparatus of Figure 2. In Figure 13, the indicia-bearing surface comprises a photographic film or comparable translucent medium 13 having the indicia to be translated thereon. In this case, the cathode ray tube 12 and a focusing lens 20 are located on one side of the surface 13 having indicia thereon, while the light-sensitive element 26 is located on the other side of the surface 13. With this arrangement, changes in the amount of light passing through the film are translated into changes in output current or voltage by the element 26. It will be observed that the scanning arrangement shown in Figure 13 differs from that shown in Figures 3 and 4 only to the extent that variations in light-transmitting properties of the surface 13, having indicia thereon, are utilized in the scanning arrangement of Figure 13, while variations in light-reflecting properties of the indicia-bearing surface are relied on in the scanning arrangement of Figures 3 and 4. For simplicity, the present discussion will be limited to the case of scanning a surface having indicia thereon of contrasting light-reflecting properties. However, the terms "light-reflecting properties" and "reflected light" as used herein and in the appended claims, will be understood to include "light-transmission properties" and "transmitted light" as explained in the foregoing.

The light beams 14 from the cathode ray tube 12 originate in a series of light spots S which are produced on the screen of the tube 12 by deflecting the cathode ray beam across the tube in a series of discrete steps. The image of the light spots S is projected onto the printed matter through the optical system of the scanning device 10, and thence reflected to the phototube 26. Since all of the reflected light is collected by a single phototube 26, provision must be made for separating the composite effect at the phototube 26 into effects corresponding to each of the hypothetical zones established by the individual light beams, so that the number of zonal reflection changes per letter can be determined.

In the system shown in Figure 2, all of the foregoing operations, including the stepwise deflection of the cathode ray beam, and separation of reflection effects, are accomplished under the control of a master oscillator circuit 28 and a frequency divider circuit 30, with the two circuits 28, 30 serving as mutually synchronized sources of control voltages for the system.

The deflection voltage for the cathode ray tube comprises a "staircase" waveshape voltage (see Fig. 10, *e*) obtained from a staircase generator circuit 32, operating under the control of the master oscillator 28 and the frequency divider 30. The staircase voltage from the generator 32 moves the cathode ray beam across the screen of the tube 12 of Figures 3 and 4 in a series of discrete steps, while "unblanking" pulses from an unblanking circuit 34 intensify the beam during each of the pauses between movements thereof, so that a series of pulsating spots S shown in Figure 4, are produced on the screen of the tube 12. A long as the scanning device 10 of Figure 2 encounters only white reflection conditions in all of the eight hypothetical zones of the printed matter, the scanning device will send out a continuous series of pulses at a frequency equal to that of the master oscillator 28. A channel separator circuit 36 separates the pulses due to any one zone from the composite pulse output of the scanner 10, by electronic timing techniques. The channel separator circuit 36 sequentially "lifts out" the pulses corresponding to each zone from the composite pulse output of the scanner 10. However, when the scanner 10 encounters black reflection in any one of the zones, the output pulses corresponding to that zone will be missing from the composite pulse train. Since "pulse absence" is a rather inconvenient phenomenon to deal with, it is deemed preferable to translate "pulse absent" information into "pulse present" information by combining the output of the channel separator circuit 36 with the output of a replacement pulse generator 37, in eight pulse replacement circuits 38 which constitute the local signal source for eight pulse counting circuits 39, one or more sequence circuits 40, and a read-and-reset-pulse generator 41. The counter circuits 39 and the sequence circuit (or circuits) 40 evaluate the information supplied by the pulse replacement circuits 38, and generate unique groups of D. C. control voltages which are predeterminedly characteristic of the letters being scanned. The various characteristic voltage groups generated by the counter and sequence circuits 39, 40 are separated from one another in a matrix network 42. The terms "matrix" and "matrix network" are used in this specification and in the accompanying claims to designate a network of input conductors, to which voltages of the same or different magnitude may be applied, said input conductors being connected in predetermined groups through high resistance elements to conductors serving as output conductors for the network, the arrangement being such that no two output conductors are connected to the same group of input conductors. In such a network, individual voltages applied to all of the input conductors can be combined in predetermined groups for any desired purpose, as, for example the separation of voltage groups characteristic of printed characters. In the system of Figure 2, voltage groups selected by the master matrix 42 are applied to control circuits 44 which selectively control the operation of a sound reproducer 46.

The sound reproducer 46 comprises a source of individual sound signals, each of which corresponds to one of the individual letter sounds of a spoken language, the arrangement being such that one of the recorded sound signals will be passed through an amplifier 66 and converted into acoustical energy in a loudspeaker 68 whenever the corresponding letter or character is encountered in the course of scanning printed matter. A read and reset pulse generator 41 is provided to serve as a source of signals for resetting the counter circuits 39 and the sequence circuit 40 after each letter is scanned, and for preventing premature operation of the sound reproducer 46. A reproducer cutoff circuit 47 is also provided, which serves to prevent continuous reproduction of a selected letter sound.

Figures 5 and 6 illustrate one form of reproducing device 46 suitable for use in the system of Figure 2. In Figures 5 and 6, the reproducer 46 is seen to include a plurality of sound discs 48 mounted on a drive shaft 50 which is continuously rotated by a driving motor 51. Each of the discs 48 is provided with a sound track 49, carrying a recorded letter-sound signal. For example, a magnetic tape carrying a magnetically recorded letter-sound may be cemented to the periphery of each disc 48. A magnetic pick-up head 52 is pivotally mounted adjacent each of the discs 48, and biased into proper pickup relation therewith by a spring 54.

All of the record discs 48 are normally held stationary by solenoid-operated latches 56 engaging with stop pins 60 extending from the faces of the discs 48, as shown. Each of the latch solenoids 62 is connected to one of the reproducer control circuits 44 of Figure 2, the arrangement being such that when a character is "recognized" in the course of scanning, the control circuit 44 selected by the matrix 42 will send a short pulse of current through the solenoid 62 associated therewith. The latch 56 of the selected solenoid will be lifted out of engagement with the stop pin 60 on the associated disc 48, permitting the disc to be rotated by the shaft 50 through the medium of a friction clutch 64. The released disc then makes one revolution, during which the previously recorded letter-sound is "played back" by the pickup head 52 associated with the selected disc, through an amplifier 66 and a loudspeaker 68 included in the system of Figure 2. At the end of a single turn of the selected disc 48, the solenoid latch 56 again engages the disc stop pin 60 to prevent further rotation of the disc until the same letter is again recognized by the master matrix.

It will be understood that the particular form of sound reproducing system shown is purely illustrative, and could as well comprise other comparable systems known in the art. For example, sound reproducing systems of the type described in the aforementioned Flory application are suitable for use in the reading aid of the present invention.

The foregoing general description is believed to be adequate to indicate the general organization of a system following the teachings of the invention, while further specific details thereof will be brought out in the following discussion of typical circuits suitable for inclusion in the system of Figure 2. Reference will be made from time to time to the waveforms shown in Figures 10 and 11 as an aid in explaining the operative relation between the various circuits described. It will be understood that the exact frequencies which have been assigned to the circuits are not critical, and have merely been selected as convenient illustrative examples. In order to simplify the drawings, dual triode vacuum tubes have been used at various points in the schematic diagrams, and for convenience of discussion the two sections of each such triode will be referred to as the "right" and the "left," or the "upper" and the "lower" sections of the tube, as they appear to one observing the drawings.

MASTER OSCILLATOR

Figure 7 is a schematic diagram of part of the circuits of Figure 2, beginning with the master oscillator 28 and continuing through the channel separator circuit 36. In Figure 7, the master oscillator 28 is seen to comprise a dual triode 70, the left section of which is connected as a blocking oscillator wherein feedback through a coil 71 will cause a recurrent, rapid swing between conditions of full conduction and cut-off in the left section of the tube 70, at a frequency which can be varied by adjusting a potentiometer 72 in the blocking oscillator portion of the circuit. The resulting positive voltage pulses at the plate of the left section of the tube 70 are applied to a self-biased clipper which comprises the right section of the tube 70, wherein the output of the blocking oscillator (left) section is reduced to a series of equal magnitude, negative pulses. The output from the clipper section of the master oscillator circuit 28 is shown at *a* in Figure 10, and is assumed to have a frequency of 4 kc. The pulses from the master oscillator 28 are applied to the frequency divider circuit 30, the staircase generator circuit 32, and the unblanking circuit 34, which will be considered in that order.

FREQUENCY DIVIDER

The frequency divider 30 consists of three identical stages 73, 74, 75, each of which comprises a dual triode tube connected as a balanced trigger circuit, wherein either section of the tube may be conducting current while the other section is cut-off. When a negative pulse of voltage is applied to any of the stages 73, 74, 75 at the junction 77 of the plate load resistors for that stage, the conditions of conduction-nonconduction in that stage will reverse, and will remain so until the application of another negative voltage pulse at the same input point 77. Each stage of the frequency divider 34 is coupled to the input point 77 of the next succeeding stage, so that two reversals in any given stage will result in a single reversal in the next succeeding stage. Accordingly, each pulse applied to the frequency divider 30 from the master oscillator 28 will cause a reversal of conditions in the first stage 73 of the circuit, while conditions in the second and third stages 74, 75 will reverse on each second and fourth pulse from the oscillator 28, respectively. As a result, the 2 kc. square wave signal shown at *b* in Figure 10 will appear at the plates of the first stage 73 of the frequency divider 30, the 1 kc. square wave signal shown at *c* in Figure 10 will appear at the plates of the second stage 74 of the frequency divider, and the 500 cycle square wave signal shown at *d* in Figure 10 will appear at the plates of the last stage 75 of the frequency divider. Balanced trigger circuits connected in the foregoing manner are well known in the art as binary counters (see e. g. U. S. Patent 2,410,156). It will be seen that the master oscillator 28 and the frequency divider 30 together provide a source of mutually synchronized signals at 4 kc., 2 kc., 1 kc., and 500 cycles. These signals will be referred to in connection with the remaining circuits of the apparatus of Figure 2.

STAIRCASE GENERATOR

As was previously mentioned, the pulsating, "spot" sources of light for the scanning device 10 in Figure 2 are obtained by step-wise deflection of a cathode ray beam. The necessary deflecting voltage is generated in the staircase generator 32 shown in Figure 7, by discharging a capacitor 78 in discrete, equal increments with 4 kc. pulses derived from the master oscillator 28. After every seventh discharging pulse, the capacitor 78 is charged by 500 cycle pulses derived from the frequency divider 30. In the staircase generator 32, 4 kc. negative pulses from the master osillator 28 are utlized to trigger a cathode coupled multivibrator stage 79, wherein the pulses from the oscillator 70 are inverted and reduced in amplitude. Positive pulses from the multivibrator 79 are applied to the grid of a normally non-conducting pentode tube 80 through an attenuator 81 in the plate circuit of the right section of the multivibrator 79. The capacitor 78, to be charge and discharged, is connected between the plate of the pentode 80 and ground, so that, assuming the capacitor 78 to be initially fully charged, each positive pulse applied to the grid of the pentode tube 80 will cause the latter to conduct momentarily, resulting in partial discharge of the capacitor 78 through the pentode 80. Over the range for which the plate current of the pentode 80 is independent of plate voltage, the magnitude of each step in the discharge of the capacitor will be constant, and will be proportional to the amplitude of the positive pulses applied to the grid of the tube 80 from the multivibrator 79.

After the occurrence of every seventh pulse at the grid of the pentode 80, a second cathode coupled multivibrator 84 is triggered by 500 cycle negative pulses derived from the frequency divider circuit 30. The second multivibrator 84 generates 500 cycle positive pulses which are applied to both sections of a dual triode 82 connected in series between the plate supply lead 83 and the plate of the pentode 80. When the dual triode 82 is rendered conducting by positive pulses from the multivibrator 84, the capacitor 78 is effectively connected directly between the plate supply lead 83 and ground, and becomes charged to substantially the full plate supply voltage. A staircase waveshape signal, shown at Figure 10, *e*, is developed across the capacitor 78, and is applied through a cathode follower stage 85 to a balanced amplifier 86, consisting of a dual triode tube 96 and two tetrode tubes 76, wherein symmetrical, opposite polarity staircase deflection voltages are developed for application to the deflecting electrodes 23 of the cathode ray tube 12.

The stepwise movements of the cathode ray beam, produced by the staircase deflection voltages from the amplifier 86, will produce pulsating spots of relatively high intensity on the screen of the tube 12, with the spots being connected by relatively low intensity traces. It is considered preferable to eliminate the traces interconnecting the light spots in order to insure complete separation between each of the hypothetical zones of the printed matter to be scanned. To this end, the normal bias on the grid 25 of the cathode ray tube 12 is made sufficiently negative to prevent the electrons in the cathode ray beam from reaching the screen of the tube 12. Positive voltage pulses generated in the unblanking circuit 34 of Figure 7 are utilized to turn on or "unblank" the beam during the periods between movements thereof, thus insuring both good definition and readily detectable "pulsing" of the light spots.

UNBLANKING CIRCUIT

In Figure 7, the unblanking circuit 34 comprises a first cathode coupled multivibrator 88 connected to the output of the master oscillator circuit 28 through a coupling capacitor 89. The multivibrator 88 is triggered by 4 kc. pulses from the master oscillator 28, and generates an unsymmetrical square wave of voltage, shown at *f* in Figure 10. The unsymmetrical square wave output of the first multivibrator 88 is differentiated in a resistor-capacitor network 87, and the differentiated signal, shown at *g* in Figure 10, is applied to a second multivibrator circuit 90. The second multivibrator 90 will not be affected by negative pulses, but will be triggered by the positive pulses in the signal shown at *g* in Figure 10. It will be seen in Figure 10 *g* that the positive-pulse portions of the differentiated signal occur at slight intervals after the 4 kc. pulses shown at Figure 10, *a*, from the master oscillator 28. A second unsymmetrical square wave of voltage, shown at *h* in Figure 10, is generated by the second multivibrator 90, with the positive portions of the square wave (Figure 10, *h*) occurring in the intervals between pulses from the master oscillator 28. Thus, as shown by the waveforms in Figure 10, *e* and *h*, the multivibrator 90 of Figure 7 produces positive pulses of finite width which occur approximately in the center of the steps of the staircase wave from the staircase generator circuit 32. The pulses from the second multivibrator 90 are applied to the grid 25 of the cathode ray tube through a cathode follower stage 91, and will turn on the cathode ray beam only during the time intervals when the beam is stationary.

The circuits 28, 30, 32, and 34 of Figure 7 are capable of providing an information signal, at the output of the phototube 26 in the scanner 10, in the form of a substantially continuous series of pulses, interrupted in accordance with changes in the reflecting properties within each of the hypothetical zones of the printed matter being scanned. It is the function of the channel separator circuit 36 of Figure 7 to separate the pulses corresponding to any one zone from those corresponding to any other zone, in order that the information contained in the composite pulse signal from the scanner 10 can be properly evaluated.

CHANNEL SEPARATOR CIRCUIT

It will be recalled that the six sections of the tubes 73, 74, 75 comprising the three stages of the frequency divider circuit 30 operate alternately in a predetermined sequence, so that the voltage at the plate of each section of the tubes 73, 74, 75 will shift between relatively "high" and "low" voltage conditions as the tube sections themselves alternately become conducting and non-conducting. In order to simplify the discussion, the terms "high" and "low" voltage are used herein to designate "more positive" and "less positive" voltages, respectively, rather than the relative absolute magnitudes of voltages. There will be a unique combination of high and low voltages at the plates of the six sections of the three tubes 73, 74, 75 in the frequency divider circuit 30 for each pulse (up to eight) from the master oscillator 28 and, hence, for each step of the staircase wave applied to the deflection plates 23 of the cathode ray tube.

This is shown in the following table, wherein the relative voltages (high or low) at the plates of the tube sections in the frequency divider circuit 30 are indicated as they will appear after the arrival of each of eight pulses from the master oscillator. The numbers and letters at the head of each column will be understood to refer to the tube numbers and sections (R—right, L—left), respectively in Figure 7. As will be shown hereinafter, the voltages at the plates of the tubes 73–75 in the frequency divider circuit 30 will also appear at the cathodes of three tubes 93–95 in the channel separator circuit 36. Table II also shows, in parentheses, the correlation between the tubes 73–75 and the tubes 93–95.

*Table II*

| Pulse No. | 73L (93L) | 73R (93R) | 74L (94L) | 74R (94R) | 75L (95L) | 75R (95R) |
|---|---|---|---|---|---|---|
| 1 | high | low | high | low | high | low |
| 2 | low | high | high | low | low | high |
| 3 | high | low | low | high | low | high |
| 4 | low | high | low | high | low | high |
| 5 | high | low | high | low | low | high |
| 6 | low | high | high | low | high | low |
| 7 | high | low | low | high | high | low |
| 8 | low | high | low | high | high | low |

In the channel separator circuit 36 of Figure 7, the unique combinations of voltages shown in Table II are utilized to separate the pulses from the scanner 10 in the following manner:

The plate of each tube section 73L–75R in the frequency divider 30 circuit is connected to the grid of one of the sections of three cathode follower stages 93, 94, 95 in the pulse separator circuit 36. With these connections, it will be apparent that the voltage across the cathode resistors 92 of the cathode follower tubes 93, 94, 95 in the channel separator circuit 36 will be replicas of the voltages at the plates of the tube 73–75 in the frequency divider circuit 30. The cathode resistor 92 of each of the cathode follower tubes 93–95 is connected to one of the input conductors 99 of a matrix network 98, hereinafter designated as the channel matrix. The channel matrix 98 comprises six "vertical" input conductors 99, a seventh vertical input conductor 101, and eight "horizontal" output conductors 110, interconnected through high resistance elements 112, say of the order of several megohms. In order to simplify the drawing, the resistors 112 have been indicated in Figure 7 by heavy dots on the intersection of the conductors 99, 101, 110 which they interconnect. Each of the eight output leads 110 from the channel matrix 98 is connected to the grid of one section of four channel "gate" tubes 113, 114, 115, 116. The cathodes of all of the gate tubes 113—116 are returned to ground through a potentiometer 118 connected across the plate voltage supply system, so that, under normal condtions, all of the gate tubes 113–116 will be cut off by positive bias on their cathodes.

Each of the output leads 110 of the channel matrix 98 is connected to three of the input leads 99 from the cathode followers 93–95. When the three input leads 99, to which any one output lead 110 (and gate tube section) is connected, are in the "high" voltage condition, the grid bias of the gate tube section connected thereto will be raised almost to the cut-off point. Hence, as the various combinations of voltages (indicated in Table I) are sequentially reproduced on the input leads 99 of the channel selector matrix, the grid bias of one or another of the gate tube sections will be raised very close to the voltage point at which the various electronic gates 113–116 will "open."

The composite pulse output of the phototube 26 is also applied to the channel matrix 98 through an amplifier 119 operating in conjunction with a biased diode 120, which limits the magnitude of the pulses from the scanning device 10. The output of the amplifier 119 is connected to the channel matrix input lead 101 which is common to all of the output leads 110, so that all of the pulses from the scanning device 10 are applied simultaneously to the grids of all sections of the gate tubes 113–116. When a pulse from the amplifier 119 reaches the grid of one section of any of the gate tubes 113–116 simultaneously with the occurrence of "high" voltages on the three channel matrix input leads 99 to which that tube section is connected, the combined input voltages for that tube section will be sufficient to cause conduction therein, and a negative pulse of voltage will be developed at the plate of the conducting tube section.

Figure 10, *i*, illustrates the foregoing action in the case of the upper section of one gate tube 113. It will be noted in Figure 7 that the grid of the upper section of the gate tube 113 is connected through the channel matrix to the cathode resistor 92 of the left section of all of the cathode follower tubes 93–95 in the channel separator circuit 36. Hence, from Table II, "high" voltage conditions will exist on all three of the channel matrix input leads 99 common to the upper section of the gate tube 113, after each "No. 1" pulse from the master oscillator 28. After each succeeding pulse from the master oscillator, the upper section of the gate tube 113 will receive "high" voltages from only two or less of the channel matrix input leads 99. The voltage at the grid of the upper section of the tube 113 is shown in Figure 10, *i*, for one series of eight master oscillator pulses, and is seen to include pulses from the amplifier 119 superimposed on the voltage pattern from the channel matrix 98. This, of course, assumes white reflecting conditions in all eight zones of the printed matter. As shown in Figure 10, *i*, the grid voltage of the upper section of the gate tube 113 will go above cut-off each time that a pulse from zone No. 1 of the printed matter reaches the upper section of the gate tube 113, through the amplifier 119. During the remaining seven pulse-output periods of the scanning device 10, the upper section of the gate tube 113 will not respond to pulses from the amplifier 119, while one or another of the remaining gate tube sections will respond as their grid voltages vary in an analogous manner. Accordingly, it will now be apparent that each section of the gate tubes 113–116 will pass only those pulses which originate in a particular zone of the printed matter, so that each of the eight gate tube sections may be thought of as related to a particular zone of the printed matter. As long as white reflecting conditions exist in all eight zones of the printed matter, a continuous series of pulses, at 500 cycles per second, will appear at the plate of each section of the gate tubes 113–116. Such pulses from any channel gate tube section will be referred to hereinafter as "white indicator" pulses. The white indicator pulses at the output $X_1$–$X_8$ of each of the channel gate tubes 113–116 are applied to a pulse replacement circuit 38 of the type shown in Figure 8, and will be further considered in the discussion of Figure 8. When black reflection occurs in any of the eight zones, no pulses will appear at the plate of the gate tube section associated with that channel. As was previously mentioned, it is advantageous to convert "pulse-absent" information, corresponding to black reflection in any zone, into "pulse-present" information. A replacement pulse generator circuit 37, shown in Figure 7, serves as a source of pulses for accomplishing the required conversion.

REPLACEMENT PULSE GENERATOR

The replacement pulse generator 37 comprises two cathode coupled multivibrators 122, 123, which are generally similar to the multivibrators 88, 90 in the unblanking circuit 34. The replacement pulse generator multivibrators 122, 123 are driven by 4 kc. pulses from the master oscillator 28, and generate an unsymmetrical square wave of voltage substantially the same as the waveform shown in Figure 10, *h*. It is considered preferable to have the replacement pulse output of the multivibrators 122, 123 slightly narrower than the pulses shown in Figure 10, *h*, from the unblanking circuit 34, and to have the replacement pulses occur approximately in the center of the time interval defined by the pulses from the unblanking circuit 34. It should be noted that the replacement pulses from the multivibrators 122, 123 will correspond generally to pulses from the scanning device 10, with the exception that the replacement pulses occur continuously, and independently of changes in the reflecting conditions at the printed matter.

The pulses from the replacement multivibrators 122, 123 are all applied to all of the output leads 125 of a resistor matrix 124 which is identical to the channel matrix 98, and is hereinafter referred to as the replacement matrix. The signals on the eight output leads 125 of the replacement matrix will correspond substantially to the signals on the output leads 110 of the channel matrix, with the previously noted exceptions that the replacement pulses are slightly narrower than the channel pulses, and occur continuously regardless of the reflecting conditions encountered by the scanner 10. Each of the output leads 125 carries signals from the replacement pulse generator 37 into a pulse replacement circuit 38, shown in Figure 8, through the output connections $Y_1$–$Y_8$.

Figure 8 is a schematic diagram of a pulse replacement circuit 38, a channel counting circuit 39, a channel sequence circuit 40, and a read and reset pulse generator 41 for the apparatus of Figure 2. In order to simplify the drawings, only one of each of the circuits 38, 39, 40 have been shown in Figure 8, although it will be understood that eight pulse replacement circuits 38 and eight channel counter circuits 39 are required in the complete apparatus of Figure 2, while one or more sequence circuits 41 can be used if desired.

PULSE REPLACEMENT CIRCUIT

The first stage of the pulse replacement circuit 38 is an "electronic gate" stage comprising a pentode tube 127, normally biased beyond cut-off by positive cathode bias voltage obtained from a voltage divider 128. The pentode gate tube 127 operates in a manner analogous to the channel separator gates 113–116 of Figure 7 with one important exception. In the case of the channel separator gates 113–116, it will be recalled that an output pulse is obtained when a channel pulse coincides with three "high" channel matrix input voltages. In the case of the replacement gate tube 127 in Figure 8, the same result would follow when a replacement pulse conicides with three "high" replacement matrix input voltages but for the fact that the supressor grid of the replacement gate tube 127 receives negative, "white-indicator" pulses from the channel gate tube 113 of Figure 7. As long as white-indicator pulses appear at the input $X_1$ of the replacement gate tube 127 of Figure 8, they will cancel the effect of replacement pulses from the replacement generator 37 which might otherwise cause the tube 127 to conduct. Conversely, when white indicator pulses fail to reach the replacement gate tube 127 (indicating black reflecting conditions in the zone associated therewith) the gate tube 127 will conduct current each time a replacement pulse coincides with three "high" voltages from the comparison matrix 124, and will produce a negative output pulse. It is obvious, then, that output pulses from the replacement gate tube 127 for any given channel indicate the absence of white-indicator pulses from the channel gate tube-section corresponding to that channel. The output pulses from the replacement gate tube 127 will hereinafter be referred to as "black-indicator" pulses. As long as black reflection persists in any given zone, the output of the replacement gate tube 127 corresponding to that zone will be a continuous series of black-indicator pulses occurring at 500 cycles. The actual number of black-indicator pulses which will occur in any one series is a variable factor, and can be seen to depend not only on the different lengths of the black letter-portions which occur in a given zone (see Figure 1), but also on the rate at which the printed matter is scanned. For example, the operator may slow down or even stop scanning in the middle of a letter, in which case black indicator pulses will be generated at one or more of the gate tubes 127 until scanning is resumed. In order to reduce one or more indicator pulses (either black or white) into a single informational impulse, a so-called "flip-flop" stage 129 is provided in the pulse replacement circuit 38, wherein only a single output pulse will be generated for each change from black to white (or vice versa) in the particular zone involved. The flip-flop circuit 129 is a reversing circuit quite similar in operation to the balanced trigger circuits 73–75 described in connection with Figure 7, being distinguished therefrom by having a dual input 129*a*, 129*b* as compared with the single input 77 of the reversing circuits 73–75 which are herein designated as balanced trigger circuits.

Black-indicator pulses from the replacement gate tube 127 are applied to the input point 129*a* for the left section of the flip-flop stage 129 through the left section of a duo-diode tube 131, while white-indicator pulses from the associated channel gate of Figure 7 are applied to the right section of the flip-flop stage 129 through the terminal $Y_1$ and the right section of the diode 131. The flip-flop stage 129 will respond only once to each uninterrupted series of pulses applied to either section thereof, and will not reverse again until the input pulses shift from one section of the stage 129 to the other. Since black-indicator pulses will appear at the flip-flop circuit 129 only in the absence of white-indicator pulses, and vice versa, the conditions of conduction-nonconduction in the flip-flop circuit 129 will indicate the reflection conditions at any given instant for the particular zone involved. Accordingly, the scanning device 10 can be moved across the printed matter at any desired rate, and can even be stopped at will in the course of scanning, without adversely affecting the derivation of information from the printed matter. If desired, a neon indicator element 137 can be connected in the plate circuit of one section of the flip-flop stage 129, to indicate which section of the flip-flop is conducting at any one instant. The indicator 137 is useful when making preliminary adjustments of the complete apparatus of Figure 2.

Each time that the flip-flop circuit 129 is reversed by a negative pulse arriving at either section thereof, the voltage at the plate of the other section will drop from a relatively high voltage to a relatively low voltage, in a manner analogous to the action accompanying a reversal in one of the stages 73–75 of the frequency divider of Figure 7. When a transition from white to black reflection occurs in a given zone, the voltage at the plate of the right section of the flip-flop 129 associated with that zone will drop to a low value. When a transition from black to white occurs, the plate voltage of the right section of the flip-flop 129 will rise, while the plate voltage of the left section will drop. The two plates of the flip-flop tube 129 are connected to a channel counter circuit 39 and to a read and reset pulse generator 41, and may also be connected to the input of a sequence circuit 40, as shown. The channel counter circuit 39, the read and reset pulse generator 41, and the sequence circuit 40 will now be considered in that order.

CHANNEL COUNTER CIRCUIT

In the counter circuit 39, the number of transitions from white to black reflection in one zone, due to one character of the printed matter, is counted and is translated into a voltage combination characteristic of the number of transitions counted. The counter circuit 39 includes two binary counter stages 132, 133, each of which is similar to one of the three stages 73–75 of the frequency divider circuit 30 of Figure 7, together with two cathode follower stages 135, 136, which are analogous to the cathode follower stages 93–95 of the channel separator circuit 36 in Figure 7. Each drop in voltage which occurs at the plate of the right section of the replacement gate flip-flop 129 due to a white-to-black transition is differentiated into a negative pulse at the input of the channel counter circuit 39. As is shown in Table I, any number of reflection transitions between 0 and 3 may occur in any one zone due to one printed character. Accordingly, the counter circuit 39 must provide four different output voltage combinations or groups corresponding to the four possible reflection transitions (including zero) which may occur in a given zone per letter. The four voltage combinations are obtained at the cathodes of the cathode follower stages 135, 136 in the counter circuit, and are shown in the following table. As in Table II above, the numbers and letters at the head of each column in Table III will be understood to refer to the tube numbers and sections (R—right, L—left), respectively, in Figure 8.

*Table III*

| Pulse No. | 135L | 135R | 136L | 136R |
|---|---|---|---|---|
| 0 | high | low | low | high |
| 1 | low | high | low | high |
| 2 | high | low | high | low |
| 3 | low | high | high | low |

The voltage combinations shown in Table III are supplied to a master selector matrix 42 shown in Figure 9 (to be described hereinafter), on four leads C-1 through C-4 connected to the cathodes of the cathode follower stages 135, 136. As in the case of the pulse replacement circuit 38, neon indicator tubes 137 may be provided in the output stages of the channel counter circuit 39 for making preliminary adjustments of the counter circuit 39.

After the information obtained from any one character of the printed matter has been evaluated by the counter circuit 39, each counter stage 132, 133 must be reset to the "zero count" condition in preparation for scanning the next succeeding character. This is accomplished by applying a positive reset pulse through coupling diodes 138 connected to the left section of each binary counter stage 132, 133 of the counting circuit 39. The reset pulses are obtained from a read and reset pulse generator 41, which also serves as a source of signals for preventing reproduction of any character sound prematurely, as, for example, the reproduction of the character sound for "n" in the course of scanning the letter "m." Although the "read" signals are not used immediately in the portion of the system presently being described, the read and reset signals are developed concurrently in the generator circuit 41, and will both be considered in connection therewith.

READ AND RESET PULSE GENERATOR

The first stage of the generator circuit 41 is a so-called cathode-coupled slicer stage 139, having the discontinuous input-output voltage characteristic shown in Figure 12. It will be seen in Figure 12 that the slicer circuit 139 of Figure 8 has but two output voltage levels, $E_o$-1 and $E_o$-2, for a relatively wide range of input voltages $E_i$. Moreover, the switch-over from low-level ($E_o$-1) to high level ($E_o$-2) output voltage occurs at a slightly higher input voltage than the converse switch-over from high-level to low-level output. In view of these operating characteristics, the slicer circuit 139 may be thought of as a trigger circuit, responsive only to relatively large changes in input voltage $E_i$.

The generator circuit 41 is coupled to all of the pulse replacement circuits 38 through eight coupling diodes 140 (only three of which are shown in Figure 8) which serve to isolate the generator 41 from transient voltages in other circuits of the system. A low positive bias voltage, from a battery 141 or the like, normally prevents conduction in the diodes 140, and maintains a low output voltage at the plate of the right section of the slicer stage 139.

It will be recalled that the voltages at the outputs of the pulse replacement circuit 38 shift between relatively high and low voltage levels as black and white indicator pulses reverse the conditions of conduction in the output stage 129. When white reflection prevails in all of the zones of the printed matter, the voltages at the plates of the left sections of all of the output stages 129 of the replacement circuits 38 will be relatively low, and will be insufficient to overcome the positive bias voltage at the cathodes of the diodes 140. When black indicator pulses appear at the output of one (or more) of the replacement circuits 38, the resulting relatively high voltage applied to the plate of the diode 140 for the channel involved will be passed on to the slicer circuit 139 through the diode 140, and will cause a shift from low to high output voltage at the plate of the right section of the slicer circuit 139. Thus, it will be apparent that a high voltage will prevail at the plate of the right section of the slicer circuit 139 as long as black reflection persists in any zone of the printed matter, and will continue to prevail until a transition occurs from black reflection in any or all zones to "all white," at the end of a letter. When the last transition from black to white occurs, the input and output voltages of the slicer circuit 139 will drop abruptly, producing a differentiated negative pulse at the grid of a normally conducting pentode 143. The foregoing is illustrated in Figure 11, wherein the waveforms *j* and *k* show the composite input (and output) voltage of the slicer circuit 139, and the signal at the grid of the pentode 143 in Figure 8, respectively, during the scan of one letter. It will be understood that the positive pulse appearing in Figure 11, *k*, at the time of transition from white to black in one or more channels at the beginning of a letter, will have no appreciable effect on the pentode 143 in Figure 8. On the other hand, each negative pulse appearing at the grid of the pentode 143 causes the positive pulse shown in Figure 11, *m*, to be developed at the plate of the pentode 143. The positive pulse at the plate of the pentode 143 is sent out, through a cathode follower stage 144, to the reproducer control circuits 44 shown in Figure 9 on a "read bus" 145, and is the previously mentioned "read" pulse. The effect of the read pulse on the control circuits 44 will be described in connection with the discussion of Figure 9.

Continuing with the read-reset pulse generator in Figure 8, the positive pulse developed at the output of the cathode follower 144 is also applied to the normally nonconducting (left) section of a start-stop multivibrator stage 146. The multivibrator 146 goes through one cycle of operation for each applied pulse, developing the negative voltage pulse shown in Figure 11, *n*, at the plate of the left section of the multivibrator 146. The negative pulse output of the multivibrator 146 is differentiated in a coupling network 147 to produce the negative and positive pulses shown in Figure 11, *o*. The negative pulse portion of the signal shown in Figure 11, *o*, is eliminated in a two section amplifier 148 while the positive pulse portion of the signal is amplified in the amplifier 148, and is passed through a second cathode follower stage 150 which is the reset-pulse output stage of the generator circuit 41. At the end of each letter scan, the positive reset pulse at the output of the cathode follower stage 150 is applied to the left section of each of the binary counter stages 132, 133 of the counting circuits 39 through the coupling diodes 138, as previously described, and serves to force all of the counters 39 into the "zero-count" condition.

THE SEQUENCE CIRCUIT

The information furnished to the master selector matrix 42 in Figure 9 by the (eight) channel counters 39 is sufficient to identify most of the letters and characters of ordinary printed matter. However, in the case of letters which are mirror images of each other (e. g. "p"—"q," "b"—"d") and for such other pairs of letters as will give identical pulse-count information (e. g. "c," "z"), it is desirable to have a means for resolving the resulting ambiguities. A sequence circuit 40, shown in Figure 7, can be used to overcome this difficulty.

The sequence circuit 40, which is sensitive to the order in which transitions between white and black reflection occur in any selected pair of zones, is seen to comprise a dual input clipper stage 151 connected to the output of the pulse replacement circuits 38 of two channels corresponding to the two selected zones. The clipping level of the input stage 151 can be adjusted by means of a potentiometer 152 in the grid bias section of the clipper circuit 151. The two outputs of the clipper stage 151 are applied to a flip-flop stage 153, wherein the last section to receive a pulse from a channel associated with the circuit 40 will be the nonconducting section, and will thereby indicate which of the two selected channels transmitted the last pulse to the sequence circuit 40. A cathode follower output stage 154 transmits the voltages representing derived sequence information to the master selector matrix 42 in Figure 9 on two output leads $S_1$, $S_2$.

In summary, the circuits 38 and 39 shown in Figure 8, together with similar circuits (not shown) comprising seven additional channels in the system of Figure 2, will provide unique groups of "high" and "low" voltages, distinctive of each individual letter or character scanned. The various groups of voltages thus generated are applied to a master selector matrix 42, shown in Figure 9, for separation.

MASTER SELECTOR MATRIX

The master selector matrix 42 of Figure 9 is a much amplified equivalent of the channel matrix 98 and the replacement matrix 124, previously described. The master matrix 42 in Figure 9 has thirty "vertical" input leads and twenty-six "horizontal" output leads. As is indicated in Figure 9, by the letters a–z, each output lead in the master matrix is allotted to one of the letters of the alphabet, and each of the output leads of the matrix 42 is connected to a preselected combination of input leads $C_1$—$C_4$, $S_1$—$S_2$ which carry the groups of voltages characteristic of the letters involved.

The master matrix 42 shown in Figure 9 is arranged to recognize the special type face letters a–z shown adjacent the "horizontal" matrix-output leads in Figure 9. As was previously explained, certain letters in ordinary printed matter, such as "mirror-image" letters and the like, require the use of sequence circuits or their equivalent to resolve ambiguities. In order to reduce the number of sequence circuit connections which would ordinarily be required, the special type face letters shown in Figure 9 have been selected for the present illustrative embodiment of the invention, since this particular type face eliminates all ambiguities except as to the letters "c" and "z." It has been assumed that one sequence circuit will be used to distinguish between the letters "c" and "z," as indicated by the two input leads $S_1$, $S_2$ within the bracket marked "sequence circuit" in Figure 9.

A further simplification has been effected as to channel No. 7 and channel No. 8 in the present embodiment. It will be noted that all of the letters a–z, shown in Figure 9, having portions which would extend into the hypothetical zones No. 7 and No. 8 of Figure 1 (i. e., "g," "j," "p," "q," "y"), are so formed that no more than two white-to-black transitions can occur in either channel No. 7 or channel No. 8. This makes it possible to eliminate one of the binary counter stages 133 from the channel counters 39 for channels No. 7 and No. 8, and hence only two master matrix input leads $C_1$, $C_2$ are required for each of the latter two channels. Four input leads $C_1$, $C_2$, $C_3$, $C_4$ are provided for channels 1 through 6 in the normal manner.

The cathode followers 135, 136, 154 in the outputs of the channel counter circuit 39 and the sequence circuit 40 of Figure 8 perform the same functions for the master selector matrix 42 of Figure 9 as do their counterparts, the cathode followers 93, 94, 95 in the channel separator circuit 36 of Figure 7, for the channel matrix 98. The various input leads $C_1$—$C_4$, $S_1$, $S_2$ of the master matrix 42 will carry into the matrix distinctive groups of "high" voltages corresponding to the individual letters scanned. As will appear more fully hereinafter, one of the requirements for reproduction of a given letter sound is that all of the master matrix input leads $C_1$—$C_4$, $S_1$, $S_2$, to which the output lead allotted to that letter is connected, must be in the "high" voltage condition. The following example will serve to illustrate how such a group of voltages can be obtained in a given case.

It can be seen in Figures 1 and 1*a* that a scan of the letter "b" will produce one white-to-black transition in each of the first three channels, two transitions in channels four and five, one transition in channel six, and "zero" transitions in channels 7 and 8. Referring to Table III above, the channel output leads $C_1$ and $C_3$ will be in the high voltage condition after one count, the leads $C_2$ and $C_4$ will be "high" after two counts, and the leads $C_1$ and $C_4$ will be "high" after "zero" counts. Accordingly, the master matrix output lead for the letter "b" is connected to the first and third leads $C_1$ and $C_3$, from channels 1, 2, 3, and 6; to the second and fourth leads, $C_2$ and $C_4$, from channels 4 and 5; and to the first lead $C_1$ from channels 7 and 8. By computing the counts in each channel for all the other letters a, c–z, it will be found that one or more of the master matrix input leads to which the "b" output lead is connected will be in the low voltage condition after scanning any letter other than "b."

REPRODUCER CONTROL CIRCUITS

Each of the output leads of the master selector matrix 42 is connected to one of twenty-six identical reproducer control circuits 44, three of which are illustrated in Figure 8. Each reproducer control circuit 44 comprises a gas tetrode tube 157, having the operating winding 158 of one of the latch solenoids 62 of Figures 3 and 4 connected in series therewith. One output lead from the master matrix 42 is connected to the control grid of each tetrode 157, while the read bus 145, carrying read pulses from the read-and-reset pulse generator 41 of Figure 7 is connected to the screen grid of all of the tetrodes 157. When the master matrix output lead for any one tetrode 157 receives only high voltages from the master matrix 42, the control grid voltage of that tetrode would be sufficiently high to cause conduction therein but for a negative voltage applied to the screen grid thereof through the read pulse bus 145 from the (c−) voltage supply (not shown) of the system. However, when any one character has been scanned, and all channels have reverted to "white" signal conditions, and read and reset pulse generator 41 sends a positive read pulse to the screen grid of all of the tetrodes 157 on the read pulse bus 145, overcoming the negative bias voltage thereon, and permitting conduction in the tetrode 157 having the proper control grid voltage. Conduction in any one of the tetrodes 157 energizes the solenoid 158 in the plate circuit thereof, thus allowing the reproducer disc associated therewith to begin rotating. Since the tetrodes 157 in the reproducer control circuits 44 are gas tubes, both the control grid and the suppressor grid lose control of conduction after the tube fires. Although the control grid and suppressor grid voltages drop immediately after one of the tetrodes 157 begins to conduct, the selected tetrode will continue to energize the solenoid 158 associated therewith, and will allow continuous reproduction of the selected letter sound unless some means is provided for cutting off the conducting tube 157. Accordingly, a reproducer cut-off circuit 47 is provided to prevent continuous reproduction of any one letter sound.

REPRODUCER CUT-OFF CIRCUIT

Input voltage for the reproducer control circuit 47 is developed across a resistor 159 connected in the cathode return circuit of all of the control tubes 157. When any one of the tubes 157 begins to conduct, a voltage will be developed across the resistor 159, and will be applied to a screen coupled trigger circuit 161 through a long time constant R-C network comprising the resistor 159, a resistor 162 and a capacitor 166. The voltage at the grid of the normally nonconducting stage 163 of the trigger circuit 161 will gradually rise until the trigger circuit 161 reverses, whereupon the rise in voltage at the plate of the normally conducting stage 164 of the trigger circuit will initiate conduction in a normally non-conducting relay control tube 165. The flow of current in the control tube 165 will energize a relay winding 167 in the plate circuit of the control tube. When the relay winding 167 is energized, a first relay tongue 168 will operate to open the plate circuit of all of the tetrodes 157, while a second relay tongue 169 will operate to close a discharge circuit for the capacitor 166. Consequently, any conducting tetrode 157 will be extinguished, deenergizing the associated solenoid winding 158, and stopping the rotation of the selected reproducer disc. At the same time, the discharge of the capacitor 166 will cause the remainder of the reproducer control circuit 47 to return to normal condition. The time constant of the R-C network 159, 162, 166 is so adjusted (by varying the resistor 159) that current will flow in the selected solenoid winding 158 just long enough to permit the associated reproducer disc to come up to speed.

It will be seen that the foregoing system provides for positive, accurate recognition and reproduction of each letter and/or character of printed matter, and is sufficiently automatic and certain in operation to require the exercise of little skill on the part of the operator. It is also possible to utilize the principles of the invention in a system for recognizing the letter groups of ordinary words for controlled sound reproduction thereof. This can be done by adding a switch 170 and a capacitor 171 to the read and reset pulse generator circuit 41 in Figure 8. With the switch 170 closed, the capacitor 171 will delay any voltage changes at the input to the slicer stage 139 when reflection conditions at the printed matter being scanned revert to white in all zones. If the scanning rate is controlled within reasonable limits, the read and reset pulse generator 41 will not respond during the relatively short interval between individual letters, but will respond during the relatively long interval between words. The connections in the master matrix 42 of Figure 9 can be rearranged as necessary to "recognize" any desired letter combination.

It is apparent that the principles of indicia recognition and translation set forth herein are by no means limited to use with an acoustic reproduction system. For example, characteristic voltages or voltage groups generated in accordance with the invention could be utilized to control the operation of a Braille-character printer in order to translate the characters of ordinary printed matter into Braille system characters. The invention is also applicable to accounting and tabulating systems, for recognizing printed or perforated indicia on index cards. Where perforated cards are used, a scanning system comparable to that shown in Figure 13 may be found to be advantageous.

It is also apparent that arbitrary coded indicia other than the characters of an alphabet could as well be recognized by the method and apparatus described, such as the punched or perforated patterns comprising teletype code and the like.

Since these and other modifications could be made in the method and apparatus shown and described, all within the scope and spirit of the invention, the foregoing is to be construed as illustrative, and not in a limiting sense.

What is claimed is:

1. Apparatus for recognizing and translating from a given surface indicia thereon of contrasting energy-reflective properties, said apparatus comprising, a source of energy, means for scanning a plurality of segmental zones of said surface with pulsating beams of energy projected upon said surface from said source, means including an element responsive to reflected energy originating in said beams and reflected from said surface for detecting changes in the amount of energy reflected from said surface within each of the zones scanned by said beams, and means including a plurality of binary counter circuits coupled to said last-mentioned means to count the number of said changes detected and generate differing voltage groups having a predetermined relation to the number of said changes detected for each of said zones.

2. Apparatus for recognizing and translating from a given surface indicia thereon of contrasting energy-reflective properties, said apparatus comprising, a source of energy, means for scanning a plurality of segmental zones of said surface with pulsating beams of energy projected upon said surface from said source, means including an element responsive to reflected energy originating in said beams and reflected from said surface for detecting changes in the amount of energy reflected from said surface within each of the zones scanned by said beams, means including counting circuits coupled to said detecting means to generate differing voltage groups representative of the number of said detected changes in each of said groups, and an auxiliary circuit coupled to said detecting means to generate additional differing voltages representative of the sequence in which said changes occur as between two of said zones.

3. Apparatus for recognizing and translating from a given surface indicia thereon of contrasting energy-reflective properties, said apparatus comprising, a source of light, means for scanning a plurality of segmental zones of said surface with pulsating beams of light projected upon said surface from said source, means including an element responsive to reflected light originating in said beams and reflected from said surface for detecting changes in the amount of light reflected from said surface within each of the zones scanned by said beams countercircuit means coupled to said detecting means to count the number of said changes occurring within each said zone, said countercircuit means including voltage generator circuits adapted to generate differing voltage groups in accordance with different counts made by said counting means, a voltage responsive control circuit connected to said voltage generator and adapted to respond differently to each said voltage group, and a utilization device connected to be controlled by said control circuit.

4. Apparatus for translating printed matter composed of a given surface having characters printed thereon of contrasting light-reflective properties into articulate sounds characteristic of a spoken language, said apparatus comprising a source of pulsating light beams, means for scanning said printed matter with pulsating beams from said source, voltage generating means responsive to pulsating reflected light originating in said beams and reflected from said printed matter for generating differing control voltage groups having a predetermined relation to the number of changes in the amount of pulsating light reflected from said printed matter, means for generating a plurality of sounds each characteristic of a spoken language, and a control circuit connecting said voltage generating means to said sound generating means to initiate generation of preselected ones of said sounds in response to generation of preselected ones of said control voltage groups.

5. Apparatus for translating printed matter composed of a given surface having characters printed thereon of contrasting light-reflective properties into articulate sounds characteristic of a spoken language, said apparatus comprising, a source of light, means for scanning a plurality of segmental zones of said printed matter with pulsating beams of light projected upon said printed matter from said source, voltage-pulse generating means responsive to pulsating light reflected from all of said zones for generating pulses of voltage, means responsive to voltage pulses from said pulse-generating means for generating differing voltage groups having a predetermined relation to the number of changes in the light reflective properties of said printed matter within said zones, means for producing sounds characteristic of a spoken language, and means responsive to said voltage groups from said voltage-generating means for controlling said sound producing means.

6. Apparatus as defined in claim 5, including means for separating said voltage pulses into separate pulse groups corresponding to pulsating light from each of said zones.

7. Apparatus for translating printed matter composed of a given surface having characters printed thereon of contrasting light-reflective properties into articulate sounds characteristic of a spoken language, said apparatus comprising, means for generating a plurality of pulsating light beams and for directing said light beams onto said printed matter, said means being movable across said printed matter to thereby illuminate said printed matter in a plurality of zones defined by the paths followed by said beams in the course of moving across said printed matter, light-sensitive means responsive to pulsating light reflected from all of said zones for generating pulses of voltage, counting circuit means responsive to pulses from said light-sensitive means for generating differing voltage groups having a predetermined relation to the number of changes in the amount of pulsating light reflected from each of said zones due to differences in the light-reflective properties of said printed matter within said zones, and means for utilizing said differing voltage groups to control the reproduction of individually recorded sounds characteristic of a spoken language, said last named means including a control circuit adapted to select predetermined ones of said individually recorded sounds in response to preselected ones of said differing voltage groups.

8. Apparatus for translating printed matter composed of a given surface having characters printed thereon of contrasting light-reflective properties into articulate sounds characteristic of a spoken language, said apparatus comprising, a scanning device including means for generating a plurality of pulsating light beams and an optical system for directing said light beams onto said printed matter, said scanning device being movable across said printed matter to thereby sequentially illuminate said characters in a plurality of zones defined by the paths followed by said light beams in the course of moving across said printed matter, a light-sensitive element associated with said scanning device and responsive to pulsating light reflected from all of said zones for generating pulses of voltage, a plurality of pulse counting circuits responsive to pulses from said element and including said pulse counting circuit for generating differing voltage groups having a predetermined relation to the number of changes in the amount of light reflected from each of said zones due to differences in the light-reflective properties of said printed matter within said zones, and means for utilizing said voltage groups to control the reproduction of recorded sounds characteristic of a spoken language.

9. Apparatus for translating printed matter composed of a given surface having characters printed thereon of contrasting light-reflective properties into articulate sounds characteristic of a spoken language, said apparatus comprising, a master voltage-pulse oscillator, means coupled to said oscillator for generating a plurality of pulsating light beams and for directing said light beams onto said printed matter, said means being movable across said printed matter to thereby illuminate said printed matter in a plurality of zones defined by the paths followed by said light beams in the course of moving across said printed matter, a light-sensitive element associated with said means and responsive to pulsating light reflected from all of said zones for generating pulses of voltage, first circuit means for separating said pulses of voltage into separate pulse-groups, each of said groups of pulses corresponding to pulsating light reflected from one of said zones, pulse-generator means coupled to said oscillator for generating voltage pulses in the absence of pulses from element, second circuit means responsive to pulses from said first circuit means and from said pulse-generator means for generating voltage groups having a predetermined relation to the number of changes in the amount of light reflected from each of said zones due to differences in the light-reflective properties of said printed matter within said zones, and means for utilizing said voltage groups to control the reproduction of recorded sounds characteristic of a spoken language.

10. Apparatus as defined in claim 9, wherein said second circuit means includes a voltage-pulse counting circuit.

11. Apparatus as defined in claim 10, wherein said second circuit means includes a circuit sensitive to the order in which said changes occur in two of said zones.

12. Apparatus as defined in claim 9, wherein said second circuit means includes a circuit sensitive to the order in which said changes occur in two of said zones.

13. Apparatus for translating printed matter composed of a given surface having characters printed thereon of contrasting light-reflective properties into articulate sounds characteristic of a spoken language, said apparatus comprising, a scanning device including (1) a cathode-ray tube for generating a plurality of pulsating light beams and (2) an optical system for directing said light beams onto said printed matter, said device being movable across said printed matter to thereby illuminate said printed matter in a plurality of zones defined by the paths followed by said light beams in the course of moving across said printed matter, a light-sensitive element in said scanning device responsive to pulsating light reflected from all of said zones for genertaing pulses of voltage, circuit means responsive to pulses from said element for genertaing voltage groups having a predetermined relation to the number of changes in the amount of light reflected from each of said zones due to differences in the light-reflective properties of said printed matter within said zones, sound producing means including a plurality of reproducible recordings of sounds characteristic of a spoken language, and control circuits associated with said sound producing means and selectively responsive to said voltage groups for controlling the operation of said sound producing means.

14. Apparatus as defined in claim 13, wherein said circuit means includes a circuit sensitive to the order in which said changes occur in two of said zones.

LESLIE E. FLORY.
WINTHROP S. PIKE.

REFERENCES CITED

The following references are of record in the file of this patent:

UNITED STATES PATENTS

| Number | Name | Date |
|---|---|---|
| 1,910,586 | Bartholomew | May 23, 1933 |
| 2,002,208 | McPorlane | May 21, 1935 |
| 2,198,248 | Hansell | Apr. 23, 1940 |
| 2,210,706 | Corlisle | Aug. 6, 1940 |
| 2,228,782 | Shorples | Jan. 14, 1941 |
| 2,432,123 | Potter | Dec. 9, 1947 |